Aug. 17, 1937.    E. W. SAWYER    2,090,312
THERMOSTATIC MATERIAL
Filed Sept. 26, 1936
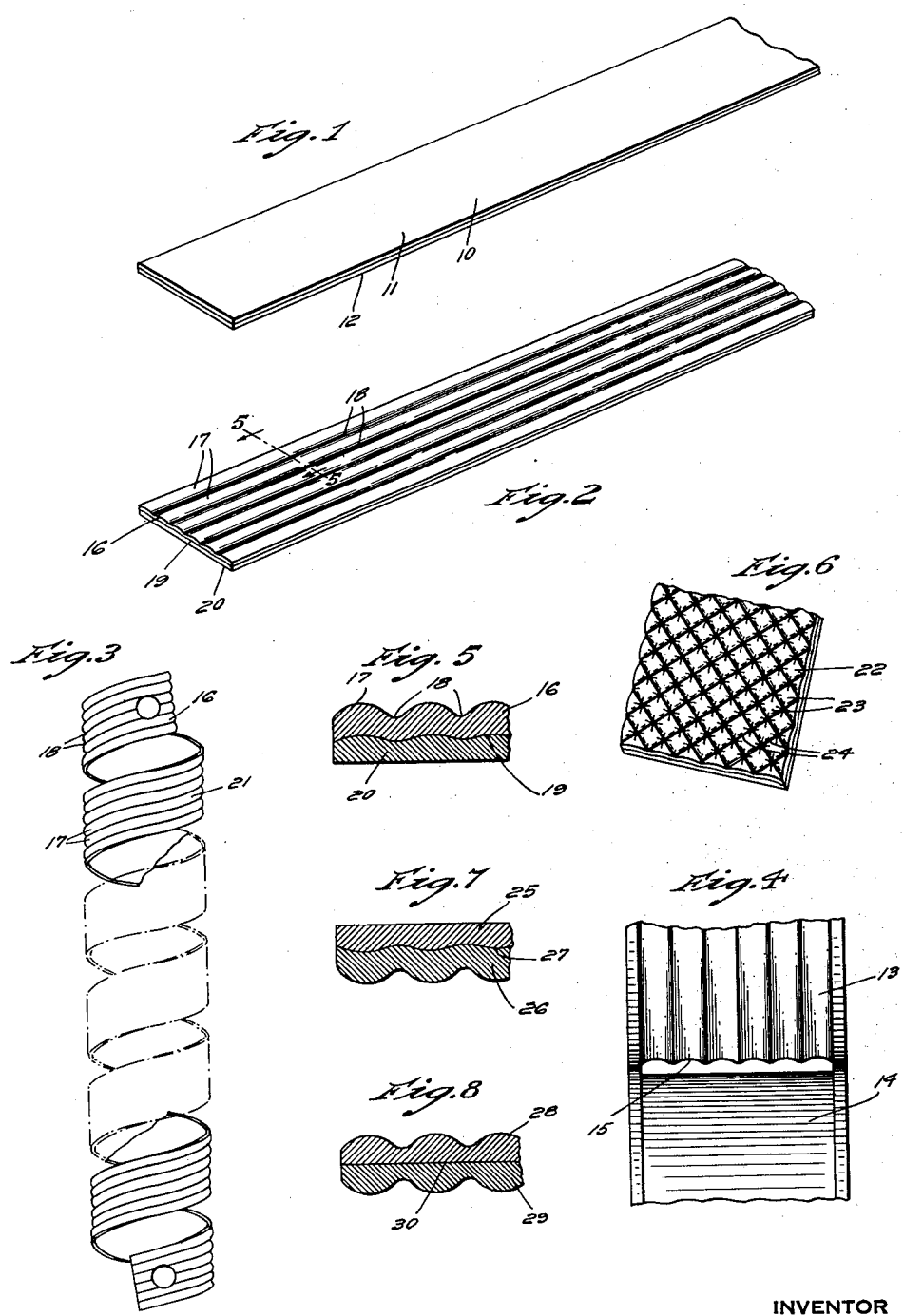
INVENTOR
Edson W. Sawyer
BY
Horatio E. Bellows
ATTORNEY Patented Aug. 17, 1937

2,090,312

UNITED STATES PATENT OFFICE 2,090,312

THERMOSTATIC MATERIAL

Edson W. Sawyer, Cranston, R. I., assignor, by mesne assignments, to Laminated Metals Corporation, a corporation of Rhode Island Application September 26, 1936, Serial No. 102,796

2 Claims. (Cl. 297—15)

This application is a continuation in part of application Ser. No. 88,332, filed July 1, 1936, for Thermostatic material.

My present invention relates to the thermostatic art, and has particular reference to a novel thermostatic material and the method of manufacture thereof.

Standard thermostatic material is formed as strips of composite metal which are welded together, the most common type being bi-metallic, one of the metals having an extremely low coefficient of expansion and the other metal having a relatively high coefficient of expansion. It has been found that the inertia of the thermostatic material, even though made in the form of thin strips, produces an appreciable time lag in the action of the thermostatic material when contacted by fluids of varying temperatures.

It is the principal object of my invention to devise a thermostatic construction having a greatly increased response to thermostatic changes, whereby this lag is lessened.

It is a further object of my invention to provide an inexpensive method of manufacturing a more responsive thermostatic material, whereby the cost of manufacture is reduced and the selling price lowered.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is a perspective view of a thermostatic strip blank;

Fig. 2 is a view of a thermostatic strip constructed to embody the principles of my invention;

Fig. 3 is a perspective view of a thermostatic strip in coil form, designed for use as a stack thermostat;

Fig. 4 is a fragmentary view showing the method of forming the novel thermostatic strip;

Fig. 5 is an enlarged section on the line 5—5 of Fig. 2;

Fig. 6 is a perspective view of a modified construction;

Fig. 7 is an enlarged section of a further modified construction; and

Fig. 8 is an enlarged section of a still further modified form.

It has been found desirable to provide a thermostatic element which has very quick response to temperature changes, thus lessening the time lag, whereby the effects of temperature changes are more quickly compensated for. I have found that this time lag can be greatly reduced by enlarging the exterior surface of a thermostatic strip, while keeping a minimum contact area between the two thermostatic elements, whereby the thermostatic strip is more quickly effected by changes in the surrounding fluid, thus increasing the speed of response of the thermostatic element. I have therefore devised a manufacturing method which enlarges the exposed surface of the thermostatic strip without increasing the engaging surface of the thermostatic metals.

To this end, I prepare a blank 10 such as disclosed in Fig. 1, comprising an upper layer 11 of metal having a high coefficient of expansion as for example a nickel chrome steel, and a lower layer 12 of metal having a low coefficient of expansion, as for example invar steel, the two being welded and rolled as to form an integral strip of thermostatic metal. Although only two layers are described and illustrated, the number of layers of metal is not material to the invention, and thermostatic strips having three or more layers of metal may be used if desired, formed as hereinafter described.

The blank 10 is passed through two rolls 13, 14, see Fig. 4, which are substantially the width and cross sectional area of the blank 10, one of the rolls, preferably the upper roll, being grooved, indented or formed as indicated at 15, to shape the upper layer 11 of the blank as indicated at 16 in Fig. 5, so as to greatly enlarge the surface thereof, a preferred formation being disclosed in Fig. 2 in which the upper layer 16 has a plurality of longitudinal panels 17 of arcuate form, separated by grooves 18, the upper layer 16 thus having an enlarged outer surface with respect to the contacting area 19 between the upper layer 16 and the lower layer 20. The outer surface of the upper layer has thus been greatly extended with respect to the engaging area between the two metal layers, thus producing a very quick response to temperature changes.

A strip of metal such as disclosed in Fig. 2 may be used to form any desired type of thermostatic element, as for example the spiral coil 21 disclosed in Fig. 3, which is suitable for use in stack thermostats. Tests of thermostats embodying the novel invention disclose that the time lag may be reduced as much as 30% for standard types of apparatus.

Instead of using longitudinal panels, the same effect may be obtained by indenting, roughing, grooving or otherwise shaping the surface so as to obtain a greatly enlarged and extended outer surface without substantial change in the contact area of the thermostatic metals forming the strip. An illustrative construction is disclosed in Fig. 6 in which the upper layer 22 is formed with a plurality of beads or squares 23 separated by grooves 24, thus providing alternate projections and depressions.

Instead of forming the upper layer as described, it has been found that the lower layer may be shaped as described, and that similar increase in the speed of action of the thermostatic strip is obtained. Thus, see Fig. 7, the upper layer 25 of metal having a high coefficient of expansion may be formed similar to the lower layer 20 of the modification of Fig. 5, and the lower layer 26 of metal of low coefficient of expansion may be formed similar to the upper layer 16 of Fig. 5. The thermostatic strip so formed will also have a speedy action, as the outer surface of the metallic strip has been enlarged, without appreciably changing the contacting area 27 of the two metals, and the natural conductivity of the metals apparently very quickly equalizes the heating effect over the entire strip.

A still quicker thermostatic action is obtained if both the upper and lower layers have their surface increased. Thus, considering Fig. 8, both the upper layer 28 of metal having a high coefficient of expansion and the lower layer 29 having a low coefficient of expansion have their outer surfaces increased with respect to the contacting area 30, thus producing a speedier movement of the thermostatic strip in response to temperature changes.

While I have disclosed specific constructional embodiments of my invention, it is obvious that the inventive concept can be applied to any thermostatic material, and that changes in the surface formation of the layers may be made to suit the requirements for different installations, without departing from the spirit and the scope of the invention as defined in the appended claims.

I claim:—

1. A thermostatic element comprising integrally joined layers of metals having different coefficients of expansion, the outer surface of one layer being formed with longitudinal ridges and grooves, after the integral joining, to be of substantially greater area than the contact area between the layers, the thickness of the completed strip being not more than 0.040 inch.

2. A thermostatic element comprising integrally joined layers of metals having different coefficients of expansion, the outer surface of one layer being formed to provide alternate thick and thin sections extending over substantially the entire length thereof, after the integral joining, to be of substantially greater area than the contact area between the layers, the thickness of the completed strip being not more than 0.040 inch.

EDSON W. SAWYER.